(12) United States Patent
Harada

(10) Patent No.: US 7,538,816 B2
(45) Date of Patent: May 26, 2009

(54) IMAGE-TAKING APPARATUS AND CONTROL METHOD OF IMAGE-TAKING APPARATUS

(75) Inventor: Yoshihito Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 11/214,486

(22) Filed: Aug. 29, 2005

(65) Prior Publication Data

US 2006/0087573 A1   Apr. 27, 2006

(30) Foreign Application Priority Data

Sep. 2, 2004   (JP)   ............... 2004-255940
Aug. 23, 2005  (JP)   ............... 2005-241061

(51) Int. Cl.
 *H04N 5/235* (2006.01)
(52) U.S. Cl. ...................... 348/362; 348/363
(58) Field of Classification Search ............... 348/368, 348/363, 362, 367, 364; 396/194, 235, 169
See application file for complete search history.

(56) References Cited

U.S. PATENT DOCUMENTS 6,542,194 B1 * 4/2003 Juen ..................... 348/367
6,831,695 B1 * 12/2004 Tamayama ............... 348/362
7,193,650 B2 * 3/2007 Oda et al. ................ 348/248
2004/0218087 A1 * 11/2004 Jazbutis et al. ........... 348/362
2005/0110894 A1 * 5/2005 Hiramatsu ............... 348/362
2005/0225664 A1 * 10/2005 Matsumoto .............. 348/362

FOREIGN PATENT DOCUMENTS

JP          11-41523       2/1999
JP          2005-159418    6/2005

* cited by examiner

*Primary Examiner*—Tuan V Ho
*Assistant Examiner*—Gary C Vieaux
(74) *Attorney, Agent, or Firm*—Locke Lord Bissell & Liddell LLP

(57) ABSTRACT

The present invention provides an image-taking apparatus having an image-pickup device which accumulates charge in accordance with an amount of light received thereon, a light-shielding device which changes a light-shielded area in the image-pickup device by causing a light-shielding blade to travel, the light-shielding blade shielding a light-receiving surface of the image-pickup device, a scan circuit which performs first scan for starting accumulation of charge for each area of the image-pickup device and performs second scan for reading the accumulated charge for each area of the image-pickup device, and a control circuit which calculates a travel characteristic of the light-shielding device based on an amount of first charge accumulated in a time period between one of the first and second scans and the travel of the light-shielding device.

24 Claims, 12 Drawing Sheets

PRIOR ART

IMAGE-TAKING APPARATUS AND CONTROL METHOD OF IMAGE-TAKING APPARATUS

BACKGROUND OF THE INVENTION

The present invention relates to an exposure control technique which uses both an electronic shutter function of controlling the timing of start of charge accumulation or reading of charge in an image-pickup device and a mechanical shutter function of covering a light-receiving surface of the image-pickup device with a light-shielding blade.

An image-taking apparatus such as a digital camera has a CCD of a progressive scan type (hereinafter referred to as PS-CCD) as an image-pickup device. With the PS-CCD used as the image-pickup device, the image-taking apparatus can control the exposure state of image data provided from output of the image-pickup device by controlling charge accumulation time from elimination of charge to transfer of accumulated charge. When the PS-CCD is used as the image-pickup device, the image-taking apparatus can adjust the charge accumulation time without using any mechanical shutter, but it is preferable to include a mechanical shutter for reducing the occurrence of smear. However, the occurrence of smear cannot be prevented since luminous flux reaches the PS-CCD even in a short time period from the completion of the charge accumulation operation in the PS-CCD to shielding of light by the mechanical shutter. Various approaches have been proposed to reduce the occurrence of smear.

On the other hand, a CMOS image sensor, which is an image-pickup device of an XY address type, has the advantage of negligibly reduced smear as compared with the CCD. Since the CMOS sensor has been technically developed for a larger size, it is often used in a digital camera of a single-lens reflex type requiring a large image-pickup device which can easily provide high-quality image data.

The CMOS image sensor of the XY address type, however, accumulates charge in different timings for different rows as a so-called rolling shutter, and thus cannot finish the accumulation operation simultaneously in all pixels. If exposure control is attempted by controlling the charge accumulation time in the CMOS image sensor, the accumulation period in the first row of scan lines is different from that in the final row approximately one frame, so that it is contemplated that the CMOS image sensor is not suitable to take a still image of a moving subject. Thus, a mechanical shutter is used for controlling the exposure time in the CMOS image sensor.

Reset operation in each row for starting charge accumulation in the CMOS image sensor is performed the time for charge accumulation before the timing of reading operation of the signal level of accumulation charge in each row. The speed of the reset operation can be different from the scan speed of the read operation of the signal level of accumulation charge. As an example of using this feature, Japanese Patent Laid-Open No. 11-41523 has disclosed an apparatus which performs exposure control by performing reset operation in a CMOS image sensor one row at a time at a speed in accordance with the travel of a mechanic shutter. The apparatus disclosed in Japanese Patent Laid-Open No. 11-41523 performs the reset operation one row at a time at the speed in accordance with the travel of the mechanical shutter to start charge accumulation, and shields light with the mechanical shutter, and then performs the read operation of the signal level of accumulated charge one row at a time. The exposure control of image data can be achieved by adjusting the interval between the reset operation and the travel of the mechanical shutter. Since the reset operation is performed one row at a time at the speed accordance with the travel of the mechanical shutter, the difference in the accumulation time between the first row and the final row of scan lines can be improved to the same level as that when a mechanical shutter is used which is provided with a light-shielding blade serving as a front curtain (hereinafter referred to as a front blade) and a light-shielding blade serving as a rear curtain (hereinafter referred to as a rear blade). According to the structure, it is possible to reduce smear in taking a moving image due to the use of the CMOS image sensor and to provide a high-speed shutter in which the CMOS takes a still image of a moving subject.

The front blade and the rear blade of the mechanical shutter, however, are typically driven by a spring and are often held at the position of start of travel through absorption with an electromagnet. For this reason, the mechanical shutter does not always move along the same curve which represents its travel characteristic (hereinafter referred to as a travel curve) because of a plurality of factors such as variations in the position of the image-taking apparatus, temperature, humidity, driving voltage of the electromagnet for holding the mechanical shutter, variations in mechanical shutters, and changes over time.

To perform the reset operation at a proper timing in associated with the travel of the mechanical shutter, it is necessary to provide a detection system which detects the travel curve of the mechanical shutter and a feedback system which controls the timing of the reset operation in accordance with the detection result. An apparatus disclosed in Japanese Patent Laid-Open No. 2005-159418 has a plurality of photointerrupters arranged in the travel direction of a front blade to detect the travel curve of the front blade from output of the photointerrupters when the front blade travels. FIG. 13 shows the structure. Reference numeral 93 shows the front blade, 94 a rear blade, and 96 an image-pickup device. Reference numeral 90 shows a blade detection mechanism which includes a plurality of photointerrupters 90-1 arranged in the travel direction of the front blade 93. The photointerrupter 90-1 includes a light emitter 91-1 and a light receiver 92-1 disposed on both sides of the front blade. The photointerrupter 90-1 detects the movement of the front blade to determine the travel curve of the front blade. The travel curve is relied on to estimate the travel curve of the rear blade, reset operation is performed, and the rear blade shields light. The structure can previously estimate the travel curve of the rear blade to control the timing of the reset operation, but the structure of the shutter is increased in size since the photointerrupters are provided. In addition, when the photosensor is disposed near the image-pickup device, it is necessary to separately provide a device for preventing the light of the photosensor from hitting the light-receiving surface of the image-pickup device. In this manner, there is still room for improvement in the structure for appropriately setting the timing of reset operation in the apparatus formed to control the exposure time through the reset operation of the image-pickup device and the travel of the blades of the mechanical shutter.

BRIEF SUMMARY OF THE INVENTION

According to at least a preferable embodiment, the present invention provides an image-taking apparatus having an image-pickup device which accumulates charge in accordance with an amount of light received thereon, a light-shielding device which changes a light-shielded area in the image-pickup device by causing a light-shielding blade to travel, the light-shielding blade shielding a light-receiving surface of the image-pickup device, a scan circuit which performs first scan for starting accumulation of charge for each area of the image-pickup device and performs second scan for reading the accumulated charge for each area of the image-pickup device, and a control circuit which calculates a travel characteristic of the light-shielding device based on an amount of first charge accumulated in a time period between one of the first and second scans and the travel of the light-shielding device.

According to at least another preferable embodiment, the present invention provides an image-taking apparatus having an image-pickup device which accumulates charge in accordance with an amount of light received thereon, a light-shielding device which changes a light- shielded area in the image-pickup device by causing a light-shielding blade to travel, the light-shielding blade shielding a light-receiving surface of the image-pickup device, a scan circuit which performs first scan for starting accumulation of charge for each area of the image-pickup device and performs second scan for reading the accumulated charge for each area of the image-pickup device and a control circuit which controls a timing for performing the first scan based on an amount of first charge accumulated in a time period between one of the first and second scans and the travel of the light-shielding device to adjust an amount of charge accumulated in a time period between the first scan and the travel of the light-shielding device.

According to at least another preferable embodiment, the present invention provides a control method for executing the functions of the abovementioned image-pickup device.

Further features of the present invention will become apparent from the following detailed description of exemplary embodiments with reference to the attached drawings.

DETAILED DESCRIPTION OF THE PREFERRED EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Exemplary embodiments will be described in detail below with reference to the drawings.

Embodiment 1

Figure 1:
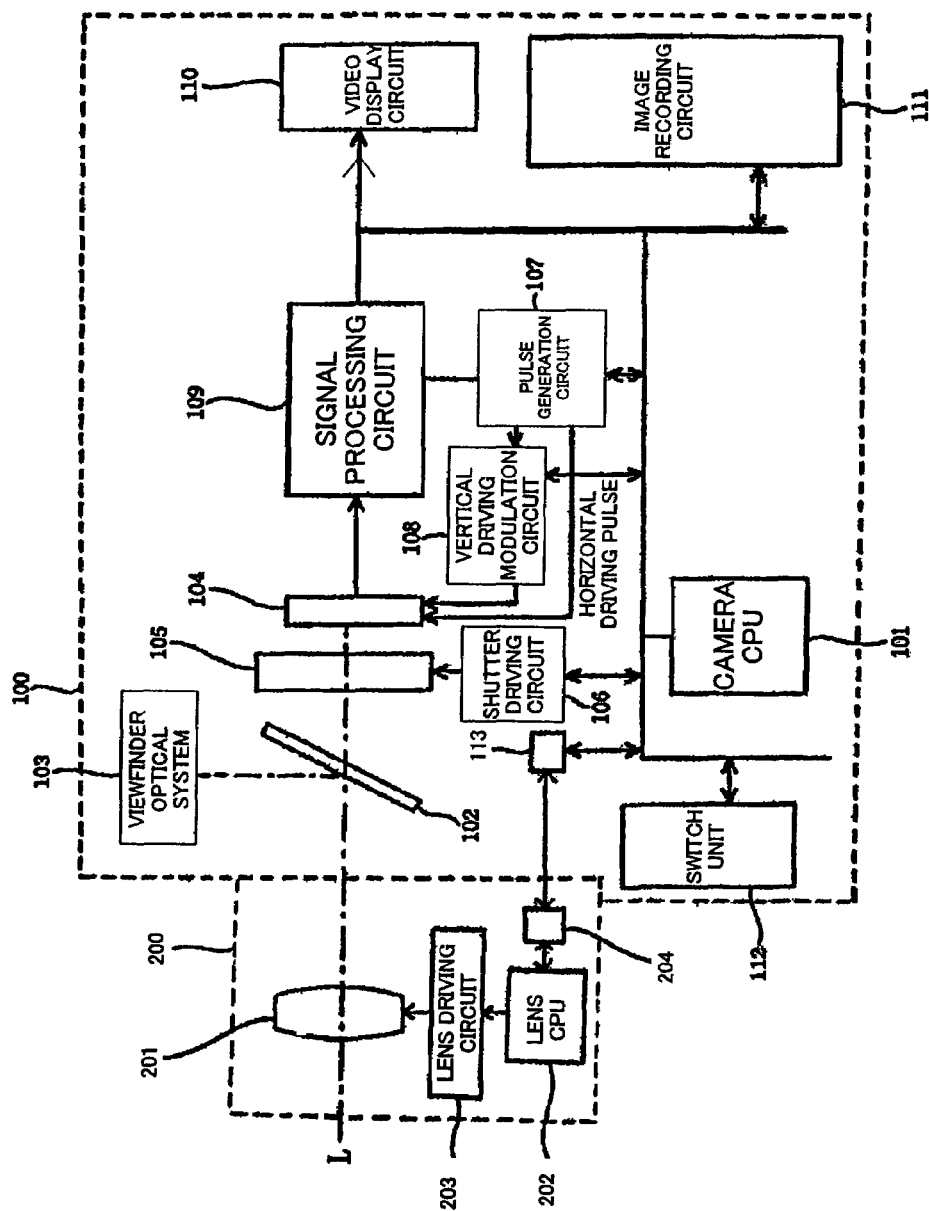
FIG. 1 shows the structure of an image-taking system according to Embodiment 1 of the present invention.

FIG. 1 shows the structure of an image-taking system according to Embodiment 1 of the present invention. The image-taking system according to Embodiment 1 has a camera body 100 serving as an image-taking apparatus and an interchangeable lens apparatus 200 which is mounted on the camera body 100. The interchangeable lens apparatus 200 may not be removably mounted on the camera body 100 and it may be integrally formed with the camera body 100.

First, description will be made of the structure in the interchangeable lens apparatus 200. Reference numeral 201 shows an image-taking lens which is movable in the direction of an optical axis L. While FIG. 1 shows only one lens for simplicity, the lens apparatus 200 includes a plurality of lens units.

Reference numeral 202 shows a lens CPU, and 203 a lens driving circuit. The lens CPU 202 controls the position of the image-taking lens 201 through the lens driving circuit 203. The lens CPU 202 communicates with a camera CPU 101 in the camera body 100 through a communication contract 204 in the interchangeable lens apparatus 200 and a communication contact 113 in the camera body 100.

Next, the structure in the camera body 100 will be described.

Reference numeral 101 shows the camera CPU, 102 a mirror member, 103 a viewfinder optical system, 104 a CMOS image sensor serving as an image-pickup device of an XY address type, and 105 a focal plane shutter serving as a mechanical shutter apparatus. The mirror member 102 is provided for reflecting luminous flux serving as a subject image transmitted through the image-taking lens 201 toward the viewfinder optical system 103. The mirror member 102 is switched between the position where it is present on the optical path and directs luminous flux toward the viewfinder optical system 103 as shown in FIG. 1 and the position where it is retracted from the optical path and directs luminous flux toward the image-pickup device 104. When a user monitors a subject through the viewfinder optical system 103, the mirror member 102 is positioned on the optical path as shown in FIG. 1. When a still image is taken, or when a user observes the moving image of a subject displayed on a video display circuit 110 to monitor the subject, the mirror member 102 is flipped up in FIG. 1 to retract from the optical path.

A shutter apparatus 105 is disposed closer to a subject than the image-pickup device 104. Light-shielding blades of the shutter apparatus 105 are retracted from the optical path to cause luminous flux to reach the image-pickup device 104.

Reference numeral 106 shows a shutter driving circuit which controls the driving of the mechanical shutter apparatus 105. Reference numeral 107 shows a pulse generation circuit, and 108 a vertical driving modulation circuit. The pulse generation circuit 107 provides the image-pickup device 104 with scan clocks and a control pulse. Of the scan clocks generated in the pulse generation circuit 107, a clock for horizontal scan is input directly to the image-pickup device 104, while a clock for vertical scan is subjected to modulation of the clock frequency to a predetermined frequency in the vertical driving modulation circuit 108 before input to the image-pickup device 104. The pulse generation circuit 107 also outputs a clock signal to a signal processing circuit 109.

Reference numeral 109 shows the signal processing circuit which performs known analog signal processing and digital signal processing on a signal read from the image-pickup device 104 to produce image data. Reference numeral 110 shows the video display circuit such as an EVF (Electric View Finder) which performs display by using the image data for display produced in the signal processing circuit 109. Reference numeral 111 shows an image record circuit which records image data for recording produced in the signal processing circuit 109 in an internal memory in the camera body or a recording medium which is removably mounted on the camera body.

Reference numeral 112 shows a switch unit which includes a switch operated to set image-taking conditions and a switch operated to start image-pickup preparatory operation and image-taking operation.

As described later, the image-taking system of Embodiment 1 opens a front blade to open the optical path, performs reset operation of the image-pickup device 104, closes a rear blade to close the optical path, and reads the accumulated charge in the image-pickup device 104 when a still image is taken. When a moving image is taken for monitoring the subject, it periodically performs read operation in the image-pickup device 104 while the light-shielding blades are opened to open the optical path.

Figure 2A:
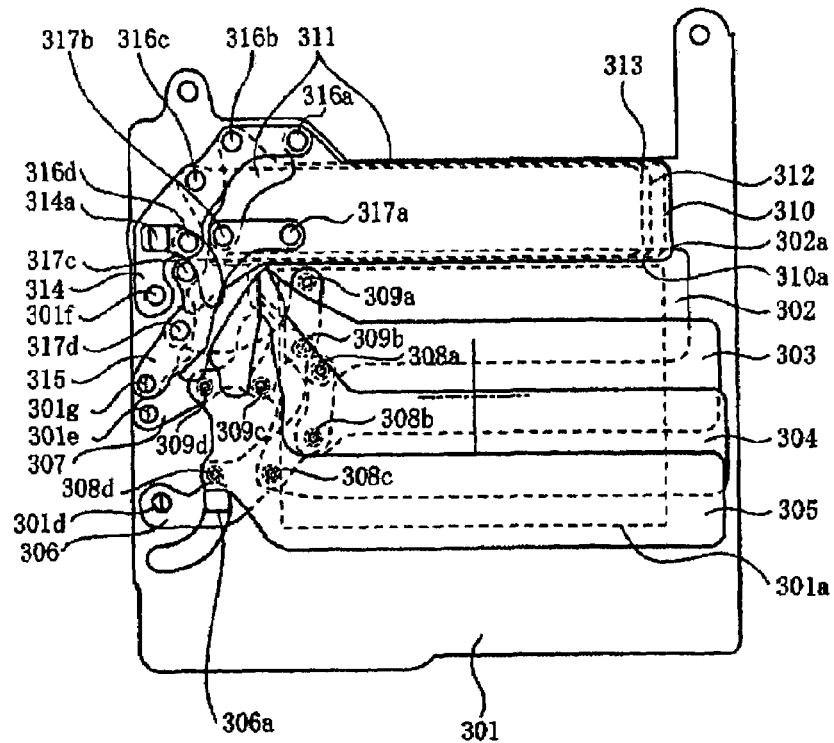
FIGS. 2A and 2B show the structure of a shutter apparatus according to Embodiment 1 of the present invention.
Figure 2B:
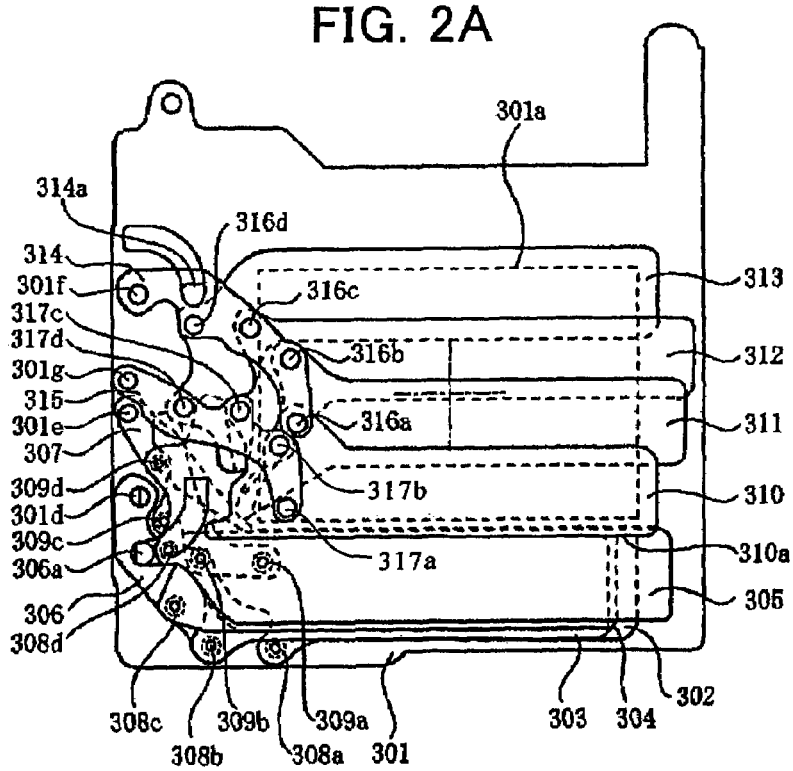

FIGS. 2A and 2B show the structure of the shutter apparatus 105 according to Embodiment 1. Specifically, FIG. 2A shows the shutter apparatus 105 before a front curtain travels, while FIG. 2B shows the shutter apparatus 105 after a rear curtain travels. Reference numeral 301 shows a shutter plate which has a shutter aperture, and 301*a* the shutter aperture. Reference numeral 302 shows a front curtain slit forming blade which has a front blade slit forming end 302*a*. Reference numerals 303, 304, and 305 show front blade covering blades, and specifically, represent a first front blade, a second front blade, and a third front blade, respectively. Reference numeral 306 shows a first arm for the front blade. The first arm 306 is rotatably pivoted about a shaft 301*d* provided for the shutter plate 301 and supports the front blade slit forming blade 302 to be rotatable with respect to the first arm 306 with a caulked dowel 308*a* provided closer to the end of the first arm 306. Reference numeral 306*a* shows a hole which receives a driving pin of a front blade driving member for transmitting driving force such as spring force to the front blade. Power can be transmitted through the hole 306*a* from the front blade driving member having a rotation axis coaxial with the shaft 301*d*. Reference numeral 307 shows a second arm for the front blade. The second arm 307 is rotatably pivoted about a shaft 301*e* provided for the shutter plate 301 and supports the front blade slit forming blade 302 to be rotatable with respect to the second arm 307 with a caulked dowel 309*a* provided closer to the end of the second arm 307. In this manner, a parallel link is formed by the front blade slit forming blade 302, the first arm 306, and the second arm 307 for the front blade. Similarly, in the front blade covering blades, the first front blade 303, the second front blade 304, and the third front blade 305 are rotatably supported in the intermediate portions between the first arm 306 and second arm 307 for the front blade with associated caulked dowels 308*b* and 309*b*, 308*c* and 309*c*, and 308*d* and 309*d*, respectively, to form a parallel link. As described above, the members 302 to 309 constitute the front blade serving as a first light-shielding plate.

The rear blade has the same structure as the front blade. Reference numeral 310 shows a rear blade slit forming blade, and 310*a* a rear blade slit forming end. Reference numerals 311, 312, and 313 show rear blade covering blades, and specifically, represent a first rear blade, a second rear blade, and a third rear blade, respectively. Reference numeral 314 shows a first arm for the rear blade. The first arm 314 is rotatably pivoted about a shaft 301*f* provided for the shutter plate 301 and supports the rear blade slit forming blade 310 to be rotatable with respect to the first arm 314 with a caulked dowel 316*a* provided closer to the end of the first arm 314. Reference numeral 314*a* shows a hole which receives a driving pin of a rear blade driving member for transmitting driving force such as spring force to the rear blade. Power can be transmitted through the hole 314*a* from the rear blade driving member having a rotation axis coaxial with the shaft 301*f*. Reference numeral 315 shows a second arm for the rear blade. The second arm 315 is rotatably pivoted about a shaft 301*g* provided for the shutter plate 301 and supports the rear blade slit forming blade 310 to be rotatable with respect to the second arm 315 with a caulked dowel 317*a* provided closer to the end of the second arm 315. In this manner, a parallel link is formed by the rear blade slit forming blade 310, the first arm 314, and the second arm 315 for the rear blade. Similarly, in the rear blade covering blades, the first rear blade 311, the second rear blade 312, and the third rear blade 313 are rotatably supported in the intermediate portions between the first arm 314 and second arm 315 with associated caulked dowels 316*b* and 317*b*, 316*c* and 317*c*, and 316*d* and 317*d*, respectively, to form a parallel link. As described above, the members 310 to 317 constitute the rear blade serving as a second light-shielding plate.

Figure 3:
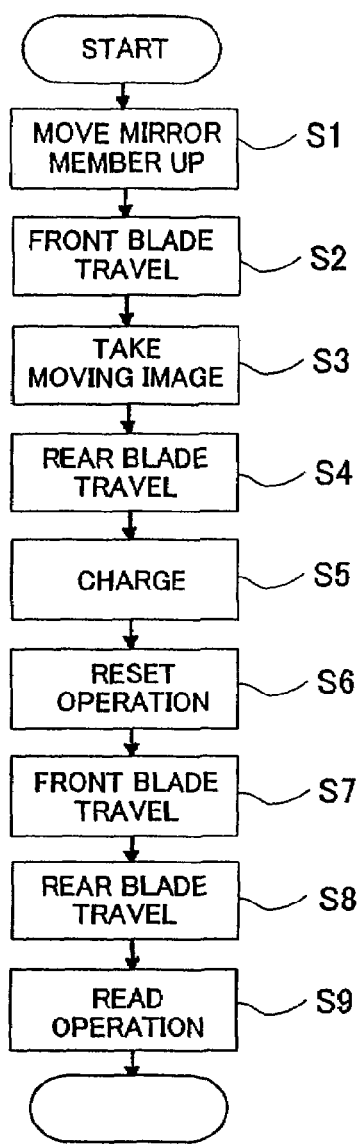
FIG. 3 is a flow chart showing mechanical operation when a moving image is taken for monitoring a subject in a conventional image-taking system.

FIG. 3 is a flow chart showing mechanical operation when a moving image is taken for monitoring a subject in a conventional image-taking system which performs exposure control of a still image based on a difference in driving timing between a front blade and a rear blade of a mechanical shutter.

When an image-taking mode is set in the camera body 100 to display a moving image for monitoring a subject on the video display circuit 110, the camera CPU 101 causes the mirror member 102 to be flipped up and retracted from the optical path at step S1. At step S2, the camera CPU 101 controls the front blade covering the shutter aperture 1*a* to travel and retract from the shutter aperture 1*a*. At step S3, the camera CPU 101 causes the image-pickup device 104 to periodically perform read operation. This can provide moving image data for monitoring a subject. When a user operates a release switch SW included in the switch unit 112, the camera CPU 101 causes the rear blade to travel and cover the shutter aperture 1a at step S4. At step S5, the camera CPU 101 moves down the mirror member 102, which has been retracted from the optical path, to return the member 102 onto the optical path and performs charge operation for returning the front blade and the rear blade to the travel start position. With the charge operation, the front blade of the shutter apparatus 105 covers the shutter aperture 1a. At step S6, the camera CPU 101 performs reset operation of the image-pickup device 104, and causes the front blade to travel and retract from the shutter aperture 1a at step S7. After the time set for exposure control elapses, the camera CPU 101 causes the rear blade to travel and cover the shutter aperture 1a step S8. At step S9, the camera CPU 101 controls the image-pickup device 104 to perform read operation of accumulated charge.

In the abovementioned flow chart, the camera CPU 101 causes the front blade to travel before a moving image is taken for monitoring a subject, but the front blade needs to travel again in taking a still image. It is thus necessary to charge at least the front blade immediately before the still image is taken. Even if the rear blade is held at the travel start position without traveling at step S4 and only the front blade is charged at step S5, the charge operation is still required.

Figure 4:
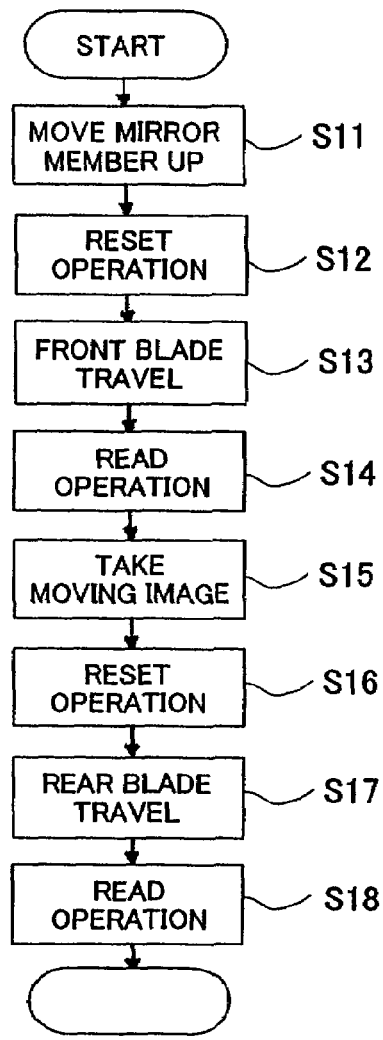
FIG. 4 is a flow chart showing mechanical operation when a moving image is taken for monitoring a subject in the image-taking system according to Embodiment 1 of the present invention.

FIG. 4 is a flow chart showing mechanical operation when a moving image is taken for monitoring a subject in the image-taking system of Embodiment 1. In the flow chart shown in FIG. 4, the front blade is caused to travel to provide a moving image for monitoring a subject, but the front blade does not need to travel in taking a still image. Thus, the charge operation of the front blade is not performed immediately before the still image is taken.

When an image-taking mode is set to display a moving image for monitoring a subject on the video display circuit 110, the camera CPU 101 causes the mirror member 102 to retract from the optical path at step S11. At step S12, the camera CPU 101 performs reset operation of the image-pickup device 104. At step S13, the camera CPU 101 controls the front blade covering the shutter aperture 1a to travel and retract from the shutter aperture 1a. At step S14, the camera CPU 101 causes the image-pickup device 104 to perform read operation to obtain image data for estimating the travel curve of the rear blade. At step S15, the camera CPU 101 controls the image-pickup device 104 to periodically perform read operation. This can provide moving image data for monitoring a subject. When a user operates the release switch SW included in the switch unit 112, the camera CPU 101 causes the image-pickup device 104 to perform reset operation in accordance with the estimated travel curve of the rear blade at step S16. At step S17, after the time set for exposure control relative to the reset operation at step S16 elapses, the camera CPU 101 causes the rear blade to travel and cover the shutter aperture 1a. At step S18, the camera CPU 101 causes the image-pickup device 104 to perform read operation of accumulated charge.

Next, description will be made of the structure and operation of the image-pickup device 104 of the XY address type in Embodiment 1. First, the structure of the image-pickup device 104 will be described with reference to schematic diagrams of FIGS. 5 and 6.

Figure 5:
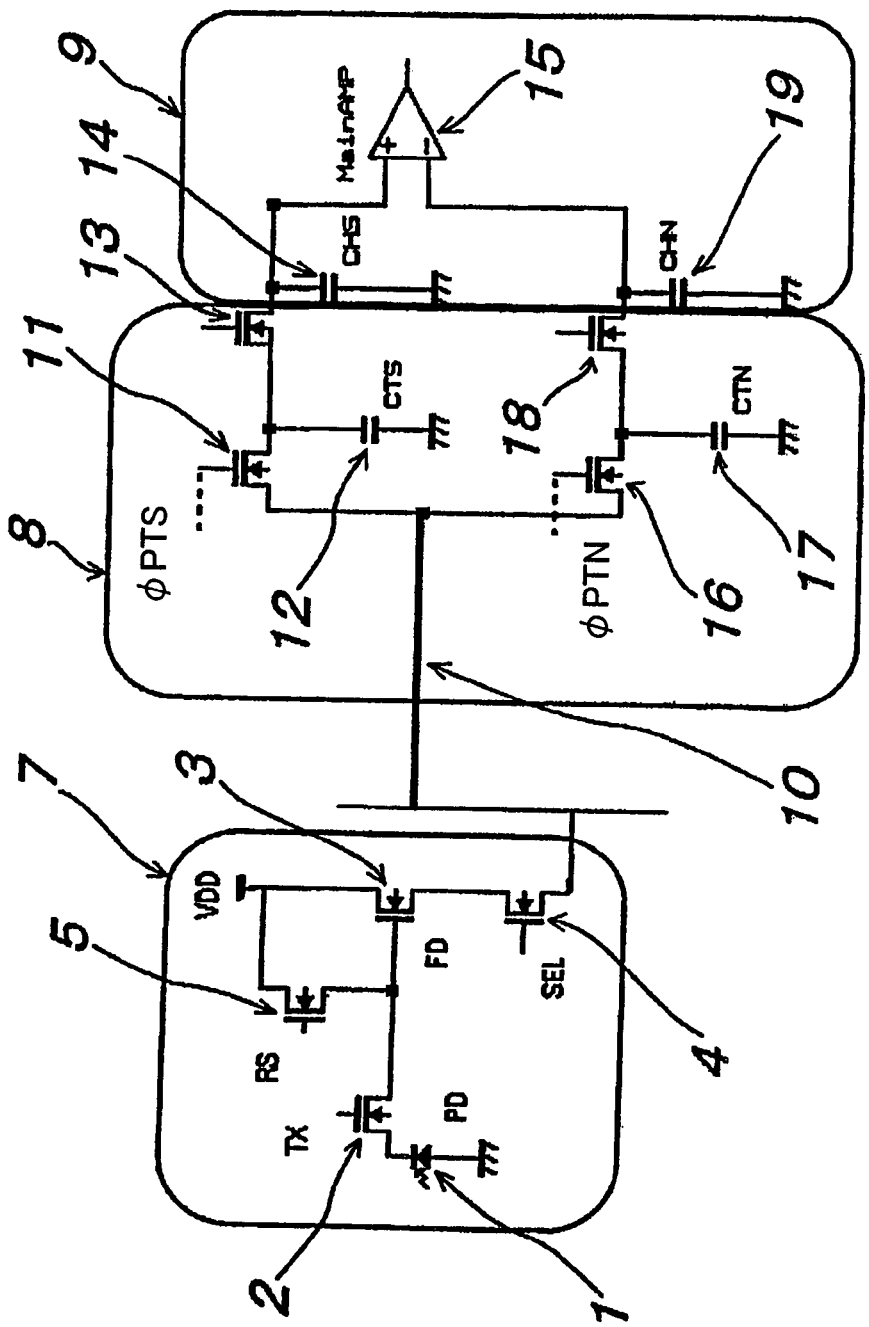
FIG. 5 is a schematic diagram showing the structure of an image-pickup device according to Embodiment 1 of the present invention.
Figure 6:
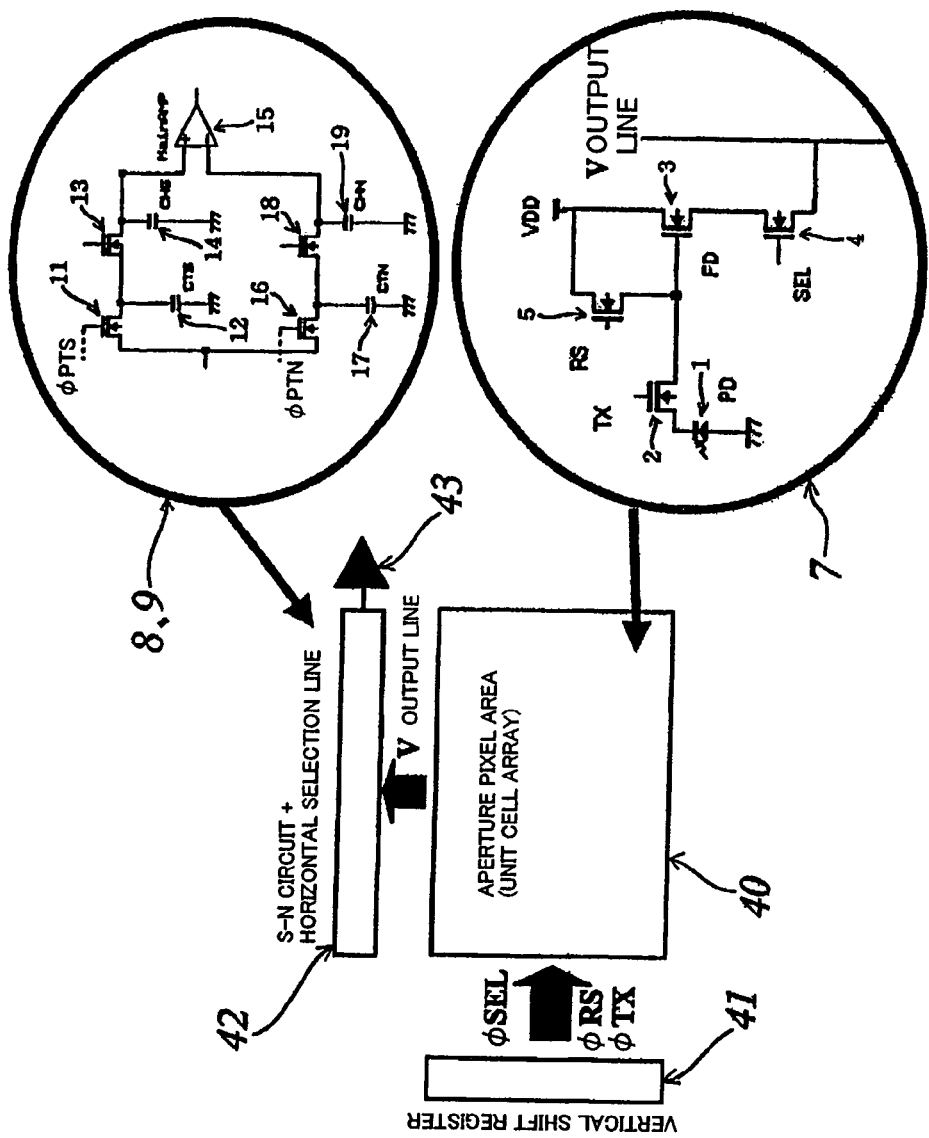
FIG. 6 is another schematic diagram showing the structure of the image-pickup device according to Embodiment 1 of the present invention.

In FIGS. 5 and 6, reference numeral 1 shows a photodiode (hereinafter abbreviated as PD) which converts light into charge through photoelectric conversion and accumulates the photoelectrically converted charge in accordance with the amount of exposure. Reference numeral 2 shows a transfer gate (hereinafter abbreviated as TX) which transfers the charge accumulated in the PD 1 to a floating diffusion amplifier (hereinafter abbreviated as FD) 3 for signal reading in response to the completion of charge accumulation in the PD 1. The FD 3 converts the amount of the charge accumulated in the PD 1 into a voltage level.

Reference numeral 4 shows a selection gate (hereinafter abbreviated as SEL) which serves as a selection switch in reading the signal from the FD 3. Reference numeral 5 shows a reset gate (hereinafter abbreviated as RS) which is used to reset the charge accumulated in the PD 1 or the voltage in the FD 3. Reference numeral 7 shows a pixel block which has the PD 1, TX 2, FD 3, SEL 4, and RS 5. The image-pickup device 104 is formed as a collection of a plurality of pixel blocks. As an example, an image-pickup device with six million pixels has six million pixel blocks 7.

Next, the operation of the image-pickup device 104 will be described.

First, the RS 5 performs reset operation of the PD 1 and the FD 3 before charge accumulation is started. Specifically, the TX 2 and the RS 5 are turned on, and then the TX 2 and the RS 5 are turned off, thereby starting charge accumulation in the PD 1. Since the charge in the FD 3 is equal to zero at the time of the start of charge accumulation, the SEL 4 is first turned on to read the signal at this point onto a vertical output line 10. The output signal is stored as a reset noise level on a capacitor CTN 17 through a switch 16 in a circuit module 8 provided in an S-n circuit block 42 shown in FIG. 6. The number of the circuit modules 8 corresponds to the number of columns in the image-pickup device 104. In FIG. 5, φPTN shows a signal for controlling the on state or off state of the switch 16.

After a predetermined time elapses, the TX 2 is turned on to transfer all the charge accumulated in the PD 1 to the FD 3 through the TX 2. After a standby time for waiting for the reading of the accumulated charge elapses, the SEL 4 is turned on to read the output corresponding to the accumulated charge through the vertical output line 10. The abovementioned output corresponding to the accumulated charge is stored as a signal level on a capacitor CTS 12 through a switch 11. In FIG. 5, φPTS shows a signal for controlling the on state or off state of the switch 11.

With the abovementioned operation, the signal level and the reset noise level are stored on the capacitor CTS 12 and the capacitor CTN 17, respectively, so that read switches 13 and 18 are turned on to connect to a differential amplifier 15 to provide an accumulation signal from which noise is removed. This is similar to the function of correlated double sample (CDS) which is often used in the CCD as reset noise cancel. Reference numerals 14 and 19 show wiring stray capacitances of input lines of the differential amplifier 15.

It is assumed that an aperture pixel area 40 shown in FIG. 6 has six million pixel blocks 7. If the ratio between the number of pixels in the vertical direction and the number of pixels in the horizontal direction is the same as the ratio in 135 films, 3000 pixel blocks 7 are arranged horizontally and 2000 pixel blocks 7 are arranged vertically. 3000 circuit modules 8 are present in the S-n circuit block 42. Only one horizontal output 43 is present.

On the other hand, a vertical shift register 41 can perform read operation of the aperture pixel area 40 of the image-pickup device 104 vertically (in the column direction) by sequentially turning on the SEL 4, RS 5, and TX 2 with the selection signal φSEL, reset signal φRS, and transfer signal φTX. The TX 2 seems to be a MOS transistor, but it is a transfer gate of the same type as a shift gate present between a PD of a CCD and a vertical CCD.

While Embodiment 1 is described with the embedded photodiode without producing dark current and the fully charge transfer gate with little noise as examples, similar effects can also be achieved by using a photodiode and a MOS transistor which are generally used.

Next, description will be made of the mechanism of the basic read operation in the abovementioned image-pickup device 104 with reference to FIG. 7.

Figure 7:
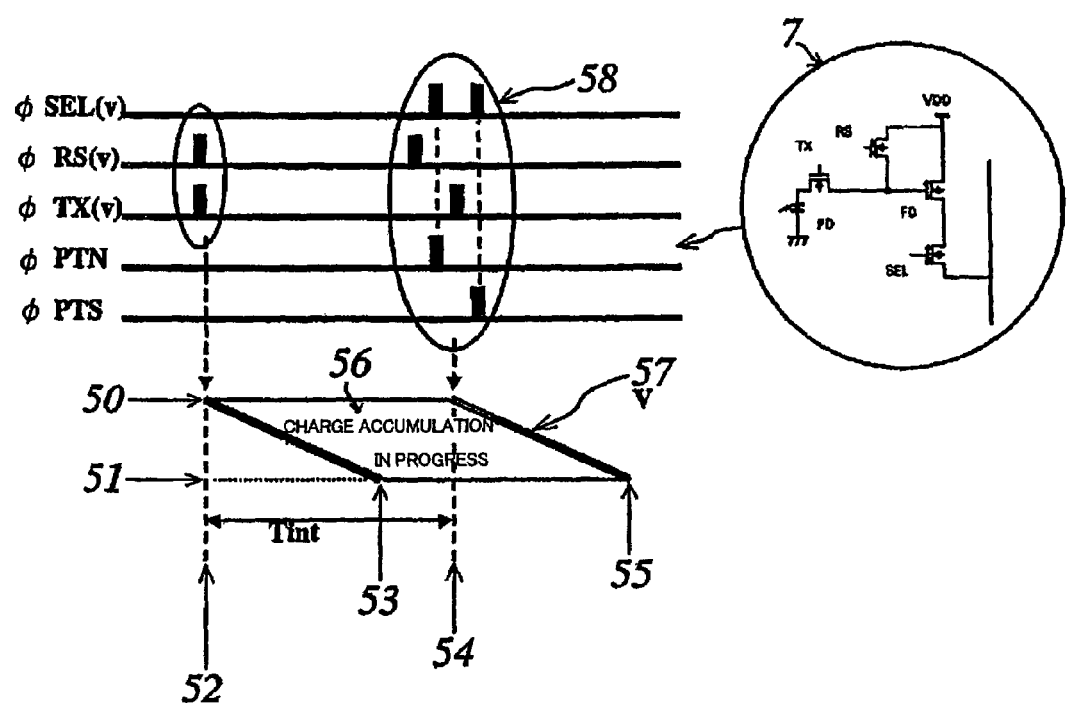
FIG. 7 is a diagram for illustrating basic read operation in the image-pickup device according to Embodiment 1 of the present invention.

Of five rows for signal waveforms shown in an upper area of FIG. 7, three rows for signal waveforms from the top represent the selection signal φSEL(v), reset signal φRS(v), and transfer signal φTX(v). The respective signals can be considered as gate signals of the SEL 4, RS 5, and TX 2 which are realized by nMOS transistors. In FIG. 7, (v) indicates the number of a row of the image-pickup device 104 in the vertical direction.

A parallelogram shown in a lower area of FIG. 7 represents the operation in pixels in each row of the image-pickup device 104 along a time axis. In FIG. 7, reference numeral 50 shows the row at the lowest position (hereinafter referred to as a lowermost row) in the aperture pixel area 40 of the image-pickup surface of the image-pickup device 104, while reference numeral 51 shows the row at the highest position (hereinafter referred to as a uppermost row) in the aperture pixel area 40 of the image-pickup surface of the image-pickup device 104. Since a subject image formed on the image-pickup surface of the image-pickup device 104 through the image-taking lens 201 is produced upside down, the lowermost row is shown at the top and the uppermost row is shown at the bottom such that they match the upper and lower positions of the produced image data.

When the TX 2 and RS 5 are turned on simultaneously in each pixel of the row 50 at a timing 52, the PD 1 and FD 3 of each pixel included in the lowermost row 50 are simultaneously reset to start charge accumulation.

FIG. 7 illustrates the rolling operation in which the charge accumulation is started in each row, the charge accumulation is finished, and the accumulated charge is read out in order from the lowermost row to the uppermost row.

The charge accumulation is started with the reset operation of the PD 1 in each pixel of the lowermost row 50, and after the time corresponding to the read time for one row elapses, reset operation is performed in the second row. Then, the reset of the PD 1 is performed sequentially to the uppermost row 51 at the same interval. Reference numeral 53 shows the timing at which charge accumulation is started in the uppermost row 51.

An area 56 surrounded by the parallelogram shows the area in which charge accumulation is performed (hereinafter referred to as a charge accumulation area). Reference numeral 54 shows the timing at which the charge accumulation is finished in the lowermost row 50. The timing 54 can also be considered as the timing at which the read operation of the accumulated charge is started in the lowermost row 50.

The horizontal length of the charge accumulation area 56, that is, the time from the timing 52 to the timing 54 is a charge accumulation time Tint in each row. When the charge accumulation is finished in each row, the charge in pixels included in each row is transferred and the signal is read by scan of columns in each row.

Specifically, as shown in 58 of FIG. 7, the RS 5 in each pixel is first turned on to perform FD reset operation for eliminating the charge in the FD 3. Then, the SEL 4 in each pixel and the switch 16 are turned on to read and store the reset level on the capacitor CTN 17. Immediately after that, the TX 2 is turned on to transfer the charge in all pixels collectively.

Next, the SEL 4 and the switch S11 are turned on to store the signal level on the capacitor CTS 12. The signals of pixels included in each row are all accumulated in the circuit module 8, the number of which corresponds to the number of pixels in the horizontal direction. Then, the signals are sequentially input to the differential amplifier 15 from the circuit module 8 present on the left side in FIG. 6 by sequentially operating the horizontal read selection switches 13 and 18, by way of example. In this manner, the outputs of all the pixels in each row can be scanned horizontally and read out.

After the read operation of pixels for one row is completed, the vertical shift register 41 performs read operation of the next row, and continues until it performs read operation of all the rows. A timing 55 shows the completion timing of read operation of all the rows.

For read operation, it is necessary to generate pulses of various control signals as shown by 58 and to read the signals of accumulated charge in a plurality of pixels of each row through scan of the columns. Consequently, it takes time to complete read operation of all the rows.

It is also necessary to set an interval between timings of start of charge accumulation in the rows in order to provide the equal charge accumulation time in the rows associated with the rolling operation from the lowermost row to the uppermost row. When the read operation of accumulated charge is finished in one row, the next charge accumulation is actually started in that row. Reference numeral 57 shows a scan line which represents the scan characteristic of the read operation showing the timing at which the read operation is performed and the position of image data in the vertical direction.

Figure 8:
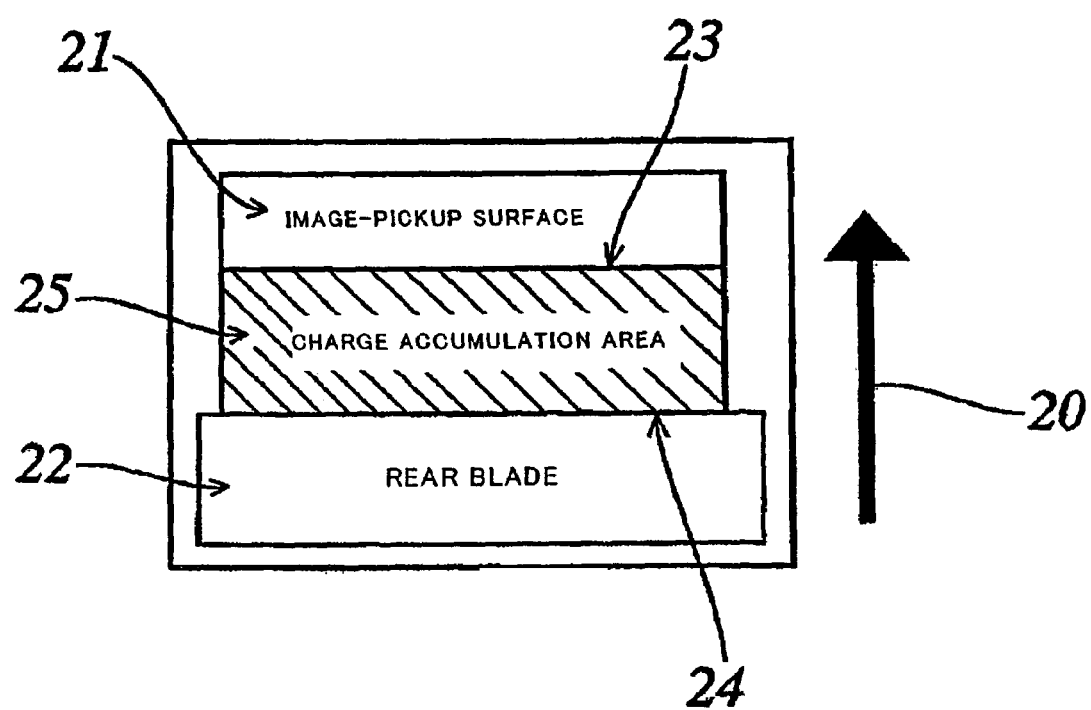
FIG. 8 shows the image-pickup device and the shutter apparatus according to Embodiment 1 of the present invention viewed from a subject.
Figure 9:
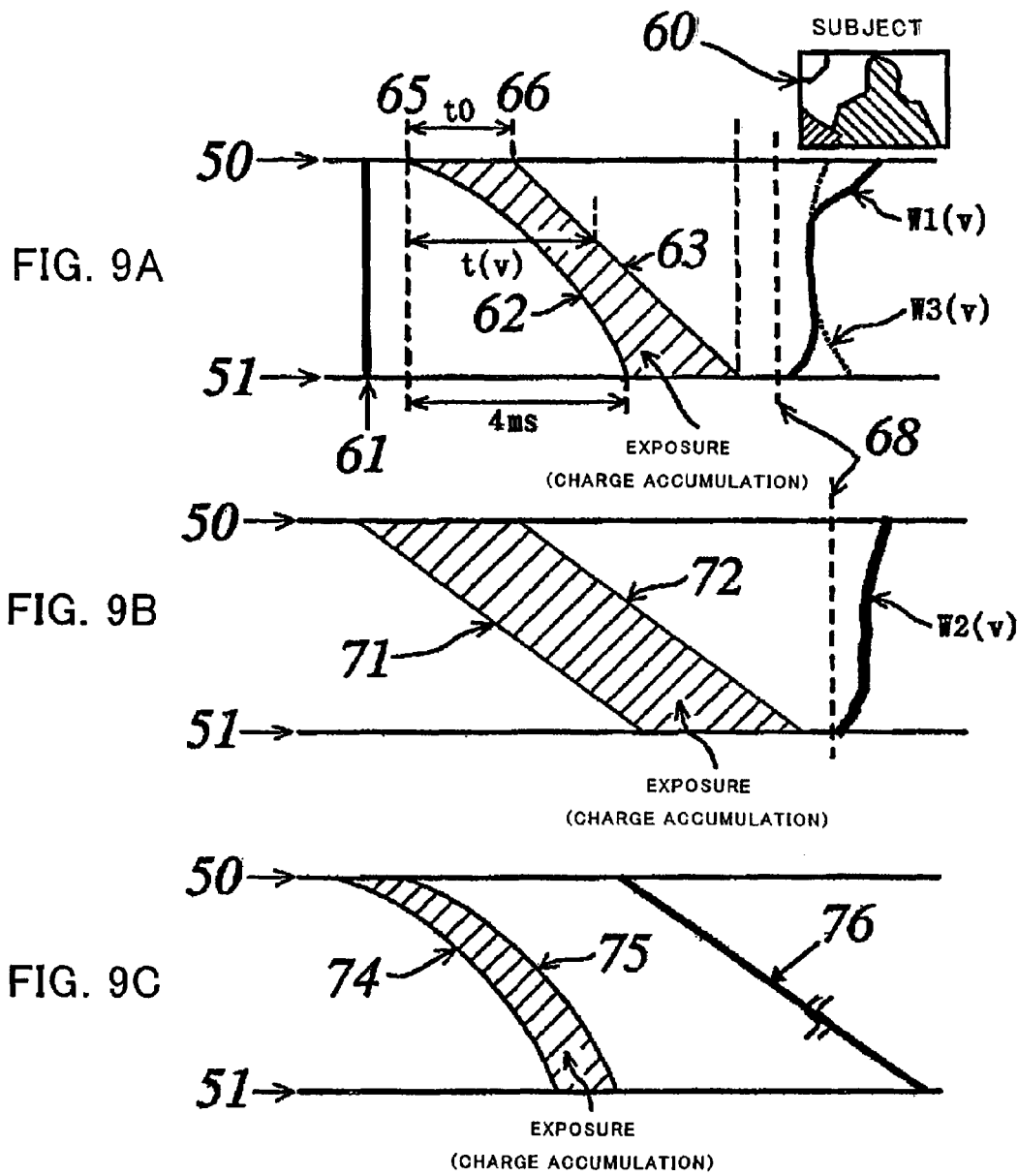
FIG. 9A illustrates a method for providing W1(v) which represents data about distribution of an exposure amount according to Embodiment 1 of the present invention.
FIG. 9B illustrates a method for providing W2(v) which represents data for providing information about luminance of a subject.
FIG. 9C illustrates a method for performing reset operation by using W3(v) derived from W1(v) and W2(v).

Next, the characteristic of Embodiment 1 will be described with reference to FIGS. 8 and 9. FIG. 8 shows the image-pickup device 104 and the rear blade of the shutter apparatus 105 from the side of a subject in the optical axis direction and illustrates the reset operation and travel of the rear-blade performed partially.

An arrow 20 shows the scan direction of the reset operation and read operation, and the travel direction of the rear blade.

An arrow 21 shows the image-pickup surface of the image-pickup device 104. Reference numeral 22 shows the rear blade which shields light in part of the image-pickup surface 21 in FIG. 8. Reference numeral 23 shows a row (reset row) in which accumulated charge is reset in the image-pickup device 104. The reset row 23 indicates the position at which the accumulation of charge is started.

The charge accumulation area corresponds to the area defined by the slit between the reset row 23 and an edge 24 of the rear blade 22. In the image-pickup device 104, the time from the passing of the reset row 23, that is, from the start of reset operation, to the shielding of light by the rear blade 22 corresponds to the time of charge accumulation with exposure in that area. The timing of charge accumulation start varies from row to row in the image-pickup device 104. The charge accumulation operation is started at the earliest timing in the lowermost row, while the charge accumulation operation is started at the latest timing in the uppermost row as described above.

FIGS. 9A, 9B, and 9C are diagrams for illustrating the operation for matching the scan timing of reset operation of the image-pickup device 104 with the travel curve of the rear blade. In other words, FIGS. 9A, 9B, and 9C are provided for illustrating the operations described in steps S12 to S14 and steps S16 to S18 described in FIG. 4.

In FIG. 9A, reference numeral 60 shows an image-taking screen. In the image-taking screen 60, a person is positioned at the center of the screen, and the sun is positioned in an upper left area of the screen. A lower left area of the screen is darkened by the shadow of the person.

FIG. 9A illustrates charge accumulation operation associated with the traveling of the front blade. The operation is performed in traveling the front blade in order to start an image-taking mode for displaying a moving image for monitoring the subject on the video display circuit 110. In FIGS. 9A, 9B, and 9C, the vertical axis represents the position in the image-pickup surface of the image-pickup device 104 in the vertical direction, while the horizontal axis represents time. The vertical axis is set such that the lowermost row of the image-pickup surface is positioned at the top and the uppermost row is positioned at the bottom to match the orientation of image data.

Reference numeral 50 shows the lowermost row in the aperture pixel area 40 of the image-pickup surface, while 51 shows the uppermost row in the aperture pixel area 40 of the image-pickup surface. Reference numeral 62 shows the travel curve of the front blade. Since the front blade is driven by spring force as described above, it does not travel at constant speed and the travel track thereof is as shown by the travel curve 62.

In FIG. 9A, it takes approximately 4 ms for the front blade to move from the lowermost row 50 to the uppermost row 51 in the image-pickup surface. In Embodiment 1, at a timing 61 before the front blade travels, charge reset is performed in all the pixels of the image-pickup device 104. Then, the front blade travels to perform exposure of the image-pickup surface of the image-pickup device 104.

When a predetermined time t0 elapses after the front blade passes the lowermost row, the charge read operation of the image-pickup device 104 is started. In the charge read operation, skip reading is performed in which charge is read out only in a plurality of specific rows without reading charge in all the rows. It is performed at a predetermined scan speed based on the predicted travel curve.

The charge accumulation time in the image-pickup device 104 corresponds to the time from the reset operation to the skip reading. While the skip reading is performed at constant speed, the front blade travels along the track shown in the travel curve 62, so that the charge accumulation time with exposure started by the travel of the front blade (hereinafter referred to as exposure accumulation time) varies from row to row.

In other words, the exposure accumulation time corresponds to the time between the travel curve 62 of the front blade and a scan line 63 showing the scan characteristic of the skip reading. The exposure accumulation time varies depending on the position in the image-pickup device 104 in the vertical direction. The variations in the exposure accumulation time represent the travel curve 62 of the front blade. If the distribution of the exposure accumulation time in the vertical direction of the image-pickup device 104 can be accurately detected, the travel curve 62 of the front blade can be determined.

If the brightness in the screen is uniform over the entire area, the exposure accumulation time in each row of the image-pickup device 104 can be determined only by detecting the exposure amount (charge accumulation amount) provided through the skip reading. The determination of the exposure accumulation time in each row can provide the travel curve 62 of the front blade. In practice, however, the determined exposure amount includes information about the luminance of the subject in addition to information about the exposure accumulation time.

It is not easy, however, to achieve uniform brightness over the entire area in the image-pickup screen. If some processing is performed to provide uniform brightness over the entire area in the image-taking screen, the time lag is increased before moving image data for monitoring the subject is provided. Thus, the information about the luminance of the subject is subtracted from the image data provided through the abovementioned skip reading to determine the information about the exposure accumulation time.

In this case, the data about the distribution of the exposure amount is represented as a function in the vertical direction of the image-pickup device 104 as shown by the distance from W1(v) to a reference line 68. Specifically, W1(v) indicates a projection image representing image data provided during the time period from the travel of the front blade to the skip reading, that is, the charge accumulation amount in each row.

The data about the distribution of the exposure accumulation time associated with the skip reading is represented as a function in the vertical direction of the image-pickup device 104 as shown in W3(v) relative to the reference line 68. The variable v is a value which indicates the position of each row in the image-pickup device 104, and the position of the lowermost row is represented as v=0.

To derive data W3(v) from data W1(v), the operation shown in FIG. 9B is performed to take image data which includes the information about the luminance of the subject.

The time period from a timing 65 when the front blade passes the lowermost row of the image-pickup surface to a timing 66 when the charge accumulation is finished in the lowermost row of the image-pickup surface associated with the skip reading is set to t0. The charge accumulation time in each row is represented as a function of t(v).

In the operation shown in FIG. 9(A), the accumulated charge may be read out from all the pixels of the image-pickup device 104. However, if reading is performed in all the pixels with the travel time of the front blade set to approximately 4 ms as described above, the time taken for reading the charge is increased as compared with the travel time of the front blade. This means that the time period from the travel of the front blade for determining the travel curve of the rear blade to the execution of display of a moving image for monitoring the subject is increased by the abovementioned time period taken for reading the charge. It is thus preferable to set substantially the same time period for reading charge as the travel time of the front blade.

In Embodiment 1, the time period for reading charge is matched to the travel time of the front blade by performing the skip reading as described above.

While the skip reading for reading charge only in specific rows is performed as described above in Embodiment 1, charge can be read out from pixels corresponding to part of the image-pickup surface. For example, it is possible that charge read operation is performed only in an area including a plurality of columns (not all columns) of the image-pickup device 104 or charge read operation is performed in part of that area including the plurality of columns with some lines excluded.

Next, description will be made of the operation for taking the information about the luminance of the subject included in the image-taking screen with reference to FIG. 9B. As described in the operation of FIG. 9A, the traveling of the front blade is already finished, and the luminous flux of the subject has reached the image-pickup surface of the image-pickup device 104.

First, reset operation is performed in each row from the lowermost row 50 to the uppermost row 51 of the image-pickup surface. After a predetermined time elapses, skip reading is performed from bottom to top of the image-pickup surface. The scan speed of the reset operation in the vertical direction (the moving speed in the vertical direction) is set to the same as the scan speed of the skip reading in the vertical direction (the moving speed in the vertical direction). Thus, the equal exposure accumulation time is set in all the rows. Reference numeral 71 shows the scan line in the reset operation, while reference numeral 72 shows the scan line in the skip reading.

When the data (image) about the exposure amount provided through the abovementioned operation is represented as a function of W2(v), the function represents the information about the luminance of a subject. Specifically, the data W2(v) about the exposure amount includes the information about the exposure accumulation time and the information about the luminance of the subject, but the information about the luminance of the subject can be provided from W2(v) by setting the equal exposure accumulation time in all the rows.

Therefore, the camera CPU 101 can perform normalization by dividing the data W1(v) provided through the operation in FIG. 9A by the data W2(v) provided through the operation in FIG. 9B to provide W3(v) which is data about the distribution of the exposure accumulation time. It is possible to estimate the travel curve 62 of the front blade from the data W3(v) about the distribution of the exposure accumulation time.

Since the reset operation shown by the scan line 71 can also be used as the skip reading shown by the scan line 63, the operations shown in FIGS. 9A and 9B can be performed in succession. As a result, the transition time in moving from the operation shown in FIG. 9A to the operation shown in FIG. 9B can be substantially ignored to considerably reduce a change in conditions between the subject in FIG. 9A and the subject in FIG. 9B. Therefore, the information about the luminance of the subject can be removed generally from W3(v).

The camera CPU 101 can control the timing of the reset operation based on the data W3(v) to generally match the scan characteristic of the reset row 23 with the travel curve of the rear blade. This allows the slit formed by the reset row 23 and the rear blade to be moved with constant width to provide the equal exposure time over the entire image-pickup area of the image-pickup device 104.

The travel curves of the front blade and rear blade can be substantially matched by forming the front blade and rear blade with substantially the same structure. In other words, the travel curve of the front blade can be detected to estimate a change in the travel curve of the rear blade due to a plurality of factors such as variations in the position of the image-taking apparatus, temperature, humidity, driving voltage of the electromagnet for holding the mechanical shutter, variations in mechanical shutters, and changes over time.

The camera CPU 101 can match the scan characteristic of the rest operation with the scan curve of the rear blade by matching the scan characteristic of the reset operation with the scan curve of the front blade.

A control time T of the reset operation in each row of the image-pickup device 104 can be determined in the following expression:

$$T=t(v)-t0 \times W3(v)/W3(0)$$

In the expression, the exposure amount W3(v) in each row of the image-pickup surface divided by the exposure amount W3(0) in the uppermost row relative to the accumulation time t0 in the lowermost row is subtracted from the charge accumulation time t(v) in each row until the skip reading.

When the operation in FIG. 9B is completed, the read operation of the image-pickup device 104 is periodically performed to start taking and displaying a moving image for monitoring the subject. In response to the operation of the release switch SW by a user while the moving image is displayed in the video display circuit 110, taking of a still image shown in FIG. 9C is started.

First, reset operation is performed in each row based on the abovementioned control time T from the lowermost row to the uppermost row. When the preset exposure time elapses from the start of the reset operation in the lowermost row, the rear blade is caused to travel and opened to start the reset operation in the lowermost row. A scan curve 74 of the reset operation generally matches a travel curve 75 of the rear blade. After the rear blade finishes the travel, read operation is performed in all the pixels of the image-pickup device 104 from the lowermost row to the uppermost row.

In this manner, according to Embodiment 1, the front blade does not need to be charged in transition from the taking of a moving image for monitoring a subject to the taking of a still image, so that the camera can move to take the still image immediately in response to the operation of the release switch SW.

As described above, according to the image-taking system of Embodiment 1, since the output from the image-pickup device is used to detect the travel curve of the front blade, another detection member such as a sensor is not required to detect the travel curve of the front blade. This can eliminate the need to increase the size of the image-taking system or the cost. In addition, it is possible to detect a plurality of factors such as variations in the position of the image-taking apparatus, temperature, humidity, driving voltage of the electromagnet for holding the mechanical shutter, variations in mechanical shutters, and changes over time, immediately before a still image is taken, thereby making it possible to accurately compensate for a change in the travel curve of the rear blade due to these factors.

Embodiment 2

Next, description will be made of Embodiment 2 centered on differences from Embodiment 1. The basic structure of an image-taking system according to Embodiment 2 is substantially the same as that of the image-taking system according to Embodiment 1 except that a shutter apparatus 105 of a camera body 100 has no front blade in the image-taking system in Embodiment 2.

Figure 10:
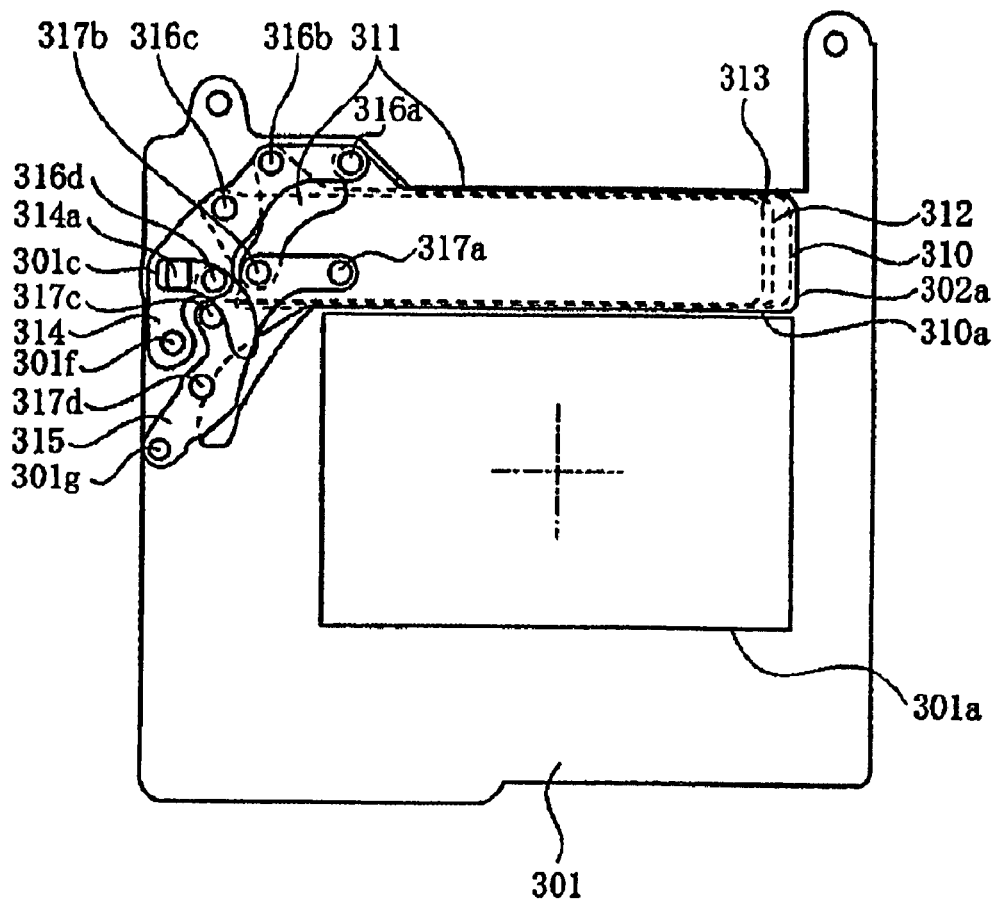
FIG. 10 shows the structure of a shutter apparatus according to Embodiment 2 of the present invention.

FIG. 10 shows the structure of the shutter apparatus 105 according to Embodiment 2 of the present invention. It differs from the shutter apparatus in Embodiment 1 in that it does not have a front curtain slit forming blade 302, a first front blade 303, a second front blade 304, a third front blade 305, a first arm 306 for the front blade, a second arm 307 for the front blade, caulked dowels 308a to 308d, or 309a to 309d which constitute the front blade. In other words, the shutter apparatus 105 of Embodiment 2 only has a rear blade. Specifically, it only has the rear blade formed by a rear blade slit forming blade 310, a first rear blade 311, a second rear blade 312, a third rear blade 313, a first arm 314, a second arm 315, caulked dowels 316a to 316d, and 317a to 317d.

Figure 11:
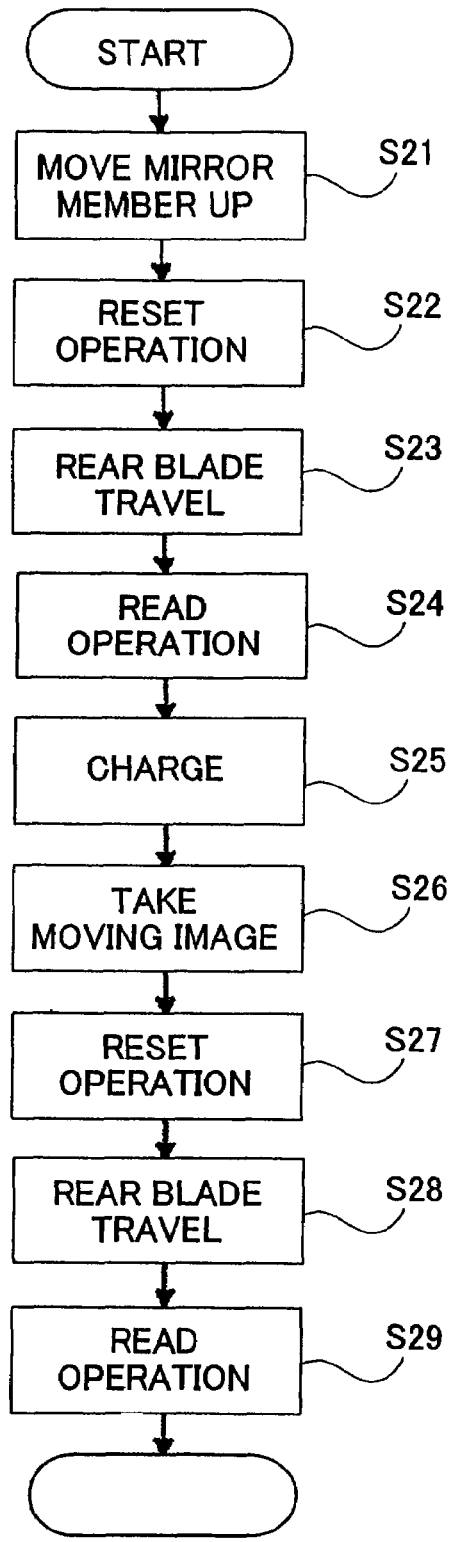
FIG. 11 is a flow chart showing mechanical operation when a moving image is taken for monitoring a subject in an image-taking system according to Embodiment 2 of the present invention.

FIG. 11 is a flow chart showing mechanical operation when a moving image is taken for monitoring a subject in the image-taking system of Embodiment 2. In the flow chart shown in FIG. 11, before the moving image is taken for monitoring the subject, the rear blade is caused to travel to provide an image signal for detecting the travel curve of the rear blade. For this reason, the rear blade after the travel needs to be charged before the start of taking of the moving image for monitoring the subject.

When an image-taking mode is set in a camera body 100 to display the moving image for monitoring the subject on a video display circuit 110, a camera CPU 101 causes a mirror member 102 to be flipped up and retracted from an optical path at step S21. At step S22, the camera CPU 101 performs reset operation of an image-pickup device 104, and causes the rear blade to travel at step S23. At step S24, the camera CPU 101 causes the image-pickup device 104 to perform read operation to obtain image data for determining the travel curve of the rear blade. At step S25, the camera CPU 101 performs charge for returning the rear blade after the travel to the travel start position. At step S26, the camera CPU 101 causes the image-pickup device 104 to periodically perform read operation. This can provide moving image data for monitoring the subject. When a user operates a release switch SW included in a switch unit 112, the camera CPU 101 performs reset operation in accordance with the determined travel curve of the rear blade at step S27. At step S28, after the time set for exposure control relative to the reset operation at step S27 elapses, the camera CPU 101 causes the rear blade to travel and cover a shutter aperture 1a. At step S29, the camera CPU 101 causes the image-pickup device 104 to perform read operation of accumulated charge.

Figure 12:
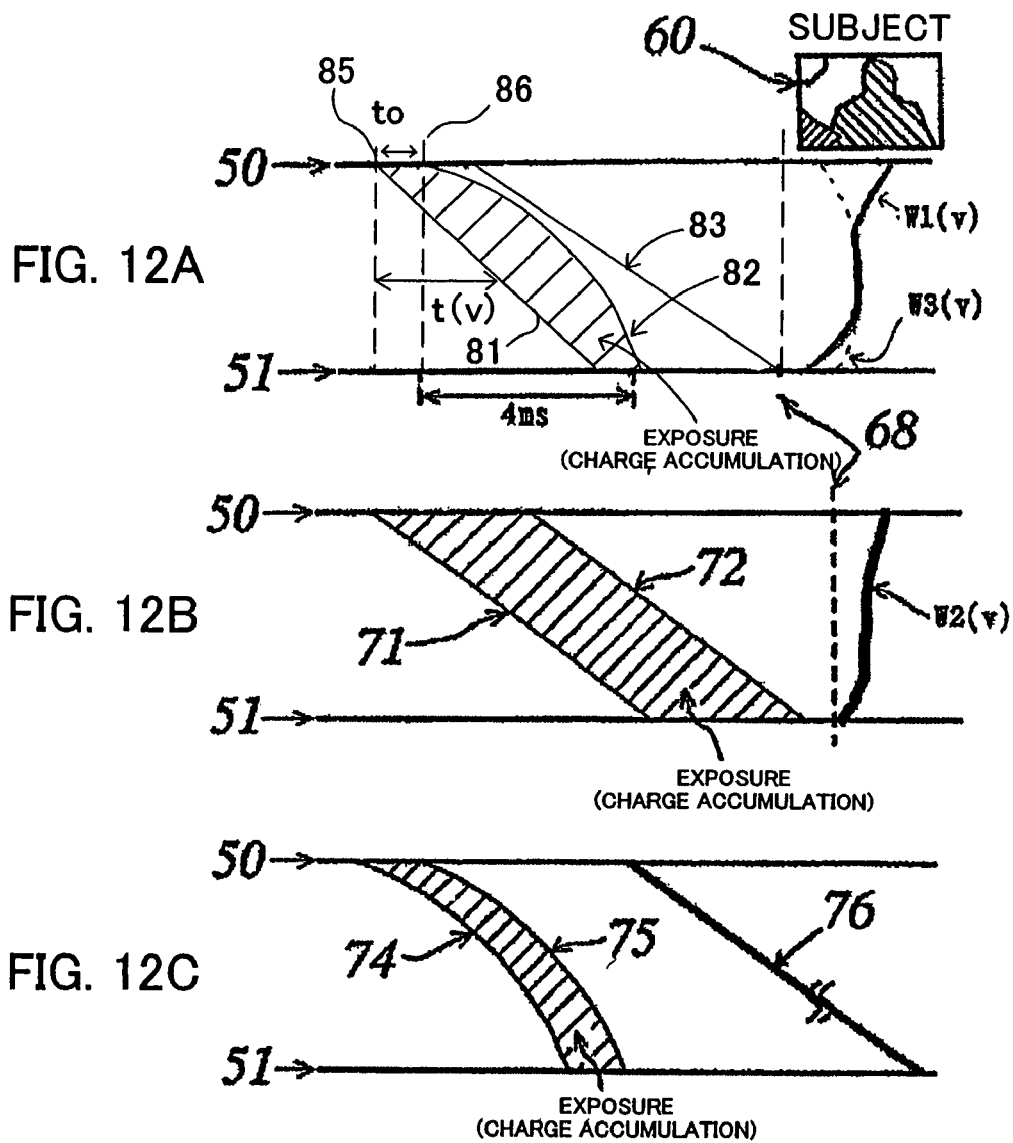
FIG. 12A illustrates a method for providing W1(v) which represents data about distribution of an exposure amount according to Embodiment 2 of the present invention.
FIG. 12B illustrates a method for providing W2(v) which represents data for providing information about luminance of a subject.
FIG. 12C illustrates a method for performing reset operation by using W3(v) derived from W1(v) and W2(v).
Figure 13:
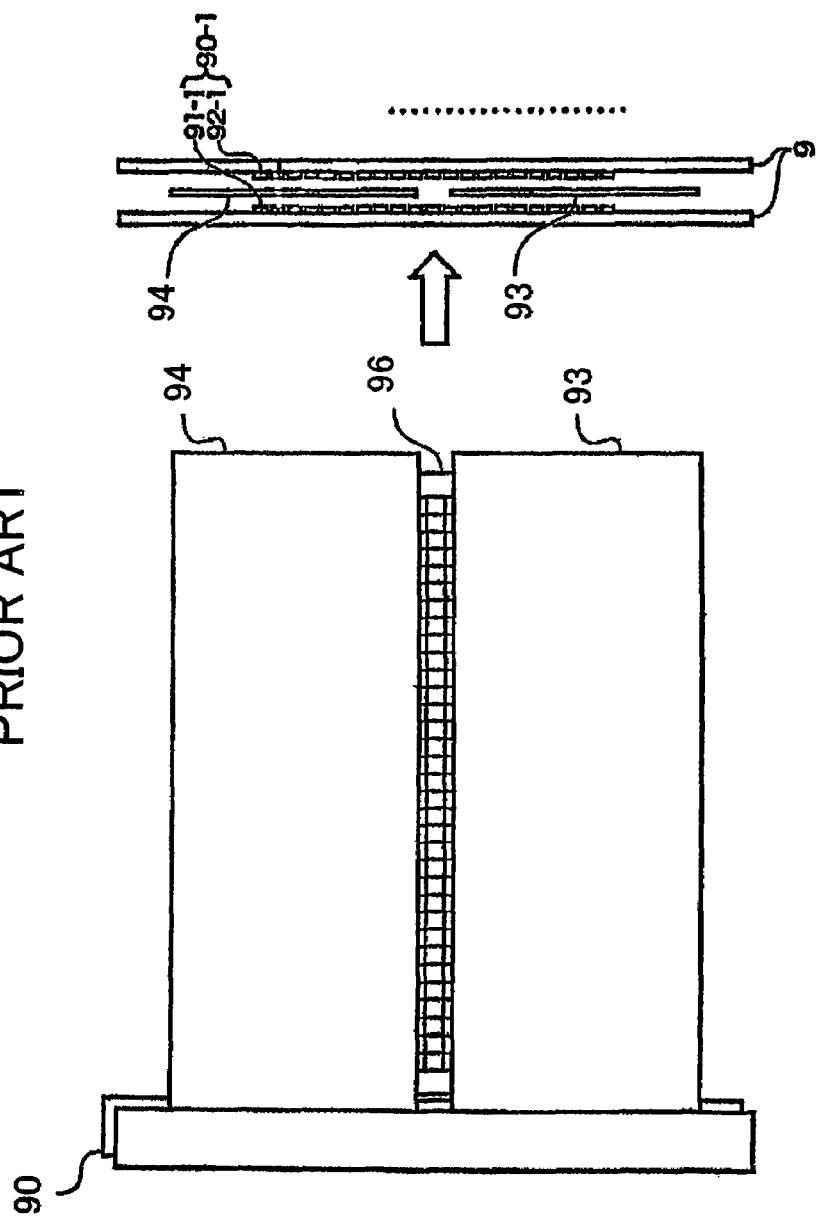
FIG. 13 shows the structure of a conventional apparatus which detects the travel characteristic of a front blade with photointerrupters.

FIGS. 12A, 12B, and 12C are diagrams for illustrating the operation for matching the scan timing of reset operation of the image-pickup device 104 with the travel curve of the rear blade. While FIG. 12A differs from FIG. 9A, FIGS. 12A and 12B are identical to FIGS. 9B and 9C, respectively.

In FIG. 12A, reference numeral 60 shows an image-taking screen. In the screen 60, a person is positioned at the center of the screen, and the sun is positioned in an upper left area of the screen. A lower left area of the screen is darkened by the shadow of the person.

FIG. 12A illustrates charge accumulation operation associated with the travel operation of the rear blade. The operation is performed before the start of the image-taking mode in which the moving image for monitoring the subject is displayed in the video display circuit 110. In FIGS. 12A, 12B, and 12C, the vertical axis represents the position in the image-pickup surface of the image-pickup device 104 in the vertical direction, while the horizontal axis represents time. The vertical axis is set such that the lowermost row of the image-pickup surface is positioned at the top and the uppermost row is positioned at the bottom to match the orientation of image data.

Reference numeral 50 shows the lowermost row in an aperture pixel area 40 of the image-pickup surface, while 51 shows an uppermost row in the aperture pixel area 40 of the image-pickup surface. Reference numeral 81 shows a scan line which represents the scan characteristic of the rest operation, 82 the travel curve of the rear blade, and 83 a scan line which represents the scan characteristic of the read operation. Since no front blade is present in Embodiment 2, luminous flux reaches the image-pickup device 104 before the shutter apparatus 105 is driven.

To detect the travel curve of the rear blade, reset operation is first performed in each row from the lowermost row to the uppermost row at constant scan speed (moving speed in the vertical direction) of the reset operation. The camera CPU 101 causes the rear blade to start traveling such that the rear blade passes the lowermost row at a timing 86 after the elapse of a predetermined time period t0 from the start of the reset operation in the lowermost row at a timing 85. After the travel of the rear blade is finished, charge read operation of the image-pickup device 104 is started. In the charge read operation, skip reading may be performed in which charge is read out only in a plurality of specific rows without reading charge in all the rows. If charge is read out in all the rows, a more accurate travel curve of the rear blade can be provided.

The charge accumulation time in the image-pickup device 104 corresponds to the time from the reset operation to the skip reading. While the rest operation is performed at constant speed as shown by a scan line 81, the rear blade travels along the track shown in a travel curve 82, so that the charge accumulation time with exposure started by the travel of the rear blade (exposure accumulation time) varies from row to row.

In other words, the exposure accumulation time corresponds to the time between the scan line 81 of the reset operation and the travel curve 82. The exposure accumulation time varies depending on the position in the image-pickup device 104 in the vertical direction. The variations in the exposure accumulation time represent the travel curve 82 of the rear blade. If the distribution of the exposure accumulation time in the vertical direction of the image-pickup device 104 can be accurately detected, the travel curve 82 of the rear blade can be determined.

Thus, the camera CPU 101 can determine charge accumulation data in each row as $W1(v)$ and data $W2(t)$ similarly to Embodiment 1 to determine $W3(v)$ about the distribution of the exposure accumulation time.

Thereafter, the camera CPU 101 determines a control time T of the reset operation in each row of the image-pickup device 104.

$$T = t(v) + t0 * W3(v)/W3(0)$$

In this manner, according to Embodiment 2, since the output from the image-pickup device is used to detect the travel curve of the rear blade, another detection member such as a sensor is not required to detect the travel curve of the rear blade. This can eliminate the need to increase the size of the image-taking system or the cost.

In addition, the charge accumulation data $W1(v)$ for providing the travel curve of the rear blade is determined with the exposure accumulation time between the scan line 81 of the reset operation and the travel curve 82 of the rear blade in Embodiment 2, the present invention is not limited thereto. It is possible that the charge accumulation data $W1(v)$ is determined by using the exposure accumulation time between the travel curve of the rear blade and the scan line of the rear operation as in Embodiment 1.

While each of Embodiments 1 and 2 has been described of the image-pickup device 104 realized by the CMOS image sensor, the image-pickup device is not limited to such a CMOS image sensor as long as an XY address type is used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims foreign priority benefits based on Japanese Patent Application No. 2004-255940, filed on Sep. 2, 2004, and 2005-241061, filed on Aug. 23, 2005, and each of which is hereby incorporated by reference herein.

What is claimed is:

1. An image-taking apparatus comprising:
   an image-pickup device which accumulates charge in accordance with an amount of light received thereon;
   a light-shielding device which changes a light-shielded area in the image-pickup device by causing a light-shielding blade to travel, the light-shielding blade shielding a light-receiving surface of the image-pickup device;
   a scan circuit which performs a first scan for starting accumulation of charge for each area of the image-pickup device and performs a second scan for reading the accumulated charge for each area of the image-pickup device; and a control circuit which calculates a travel characteristic of the light-shielding device based on an amount of first charge accumulated in a time period between one of the first and second scans and the travel of the light-shielding device.

2. The image-taking apparatus according to claim 1, wherein the scan circuit performs the first scan and the second scan in a direction in which the light-shielding device changes the light-shielded area.

3. The image-taking apparatus according to claim 1, wherein the control circuit calculates the travel characteristic of the light-shielding device based on the amount of the first charge and an amount of second charge accumulated in a time period from the first scan to the second scan in a state in which the light-receiving surface of the image-pickup device is not shielded by the light-shielding device.

4. The image-taking apparatus according to claim 1, wherein the first charge is charge accumulated in a time period from the first scan to the shielding of the light-receiving surface by the light-shielding device.

5. The image-taking apparatus according to claim 1, wherein the first charge is charge accumulated in a time period from release of the light shielding of the light-receiving surface by the light-shielding device to the second scan.

6. The image-taking apparatus according to claim 5, wherein the scan circuit performs the second scan for providing the first charge in part of the light-receiving surface.

7. The image-taking apparatus according to claim 1, wherein the travel characteristic represents a travel position of the light-shielding blade over time during the travel of the light-shielding device.

8. The image-taking apparatus according to claim 1, wherein the control circuit controls a timing for performing the first scan based on the calculated travel characteristic.

9. An image-taking apparatus comprising:
an image-pickup device which accumulates charge in accordance with an amount of light received thereon;
a light-shielding device which changes a light-shielded area in the image-pickup device by causing a light-shielding blade to travel, the light-shielding blade shielding a light-receiving surface of the image-pickup device;
a scan circuit which performs a first scan for starting accumulation of charge for each area of the image-pickup device and performs a second scan for reading the accumulated charge for each area of the image-pickup device; and
a control circuit which controls a timing for performing the first scan based on an amount of first charge accumulated in a time period between one of the first and second scans and the travel of the light-shielding device and an amount of second charge accumulated in a time period between the first scan and the second scan in a state in which the light-receiving surface of the image-pickup device is not shielded by the light-shielding device, to adjust an amount of charge accumulated in a time period between the first scan and the travel of the light-shielding device.

10. The image-taking apparatus according to claim 9, wherein the control circuit controls the timing for performing the first scan such that the shape of a curve representing a position of a scan area over time in performing the first scan approaches the shape of a curve representing a travel position of the light-shielding blade over time during the travel of the light-shielding device.

11. An image-taking apparatus comprising:
an image-pickup device which accumulates charge in accordance with an amount of light received thereon;
a light-shielding device which changes a light-shielded area in the image-pickup device by causing a front blade or a rear blade to travel, the front blade and the rear blade shielding a light-receiving surface of the image-pickup device;
a scan circuit which performs a first scan for starting accumulation of charge for each area of the image-pickup device and performs a second scan for reading the accumulated charge for each area of the image-pickup device; and
a control circuit which controls a timing for the first scan, based on an amount of first charge accumulated in a time period from release of the light shielding of the light-receiving surface of the image-pickup device by the front blade to the second scan and an amount of second charge accumulated in a time period from the first scan to the second scan in a state in which the light-receiving surface of the image-pickup device is not shielded by the light-shielding device, to adjust an amount of third charge accumulated in a time period from the first scan to light shielding of the light-receiving surface of the image-pickup device by the rear blade.

12. The image-taking apparatus according to claim 11, wherein the control circuit controls the scan circuit and a driving member such that the first charge is provided before the second charge.

13. A method of controlling an image-taking apparatus comprising an image-pickup device which accumulates charge in accordance with an amount of light received thereon, a light-shielding device which changes a light-shielded area in the image-pickup device by causing a light-shielding blade to travel, the light-shielding blade shielding a light-receiving surface of the image-pickup device, and a scan circuit which performs a first scan for starting accumulation of charge for each area of the image-pickup device and performs a second scan for reading the accumulated charge for each area of the image-pickup device, the method comprising the steps of:
providing first charge accumulated in a time period between one of the first and second scans by the scan circuit and the travel of the light-shielding blade by the light-shielding device; and
calculating a travel characteristic of the light-shielding device based on the amount of the first charge.

14. The control method according to claim 13, wherein the scan circuit performs the first scan or the second scan in a direction in which the light-shielding device changes the light-shielded area in the step of providing the first charge.

15. The control method according to claim 13, further comprising the step of providing second charge accumulated in a time period from the first scan to the second scan in a state in which the light-receiving surface of the image-pickup device is not shielded by the light-shielding device, wherein the travel characteristic of the light-shielding device is calculated on the basis of the amount of the first charge and the amount of the second charge in the calculation step.

16. The control method according to claim 13, wherein the scan circuit performs the first scan and then the light-shielding device shields light in the light-receiving surface of the image-pickup device in the step of providing the first charge.

17. The control method according to claim 13, wherein the light-shielding device releases light shielding of the light-receiving surface of the image-pickup device and then the scan circuit performs the second scan in the step of providing the first charge.

18. The control method according to claim 17, wherein the scan circuit performs the second scan in part of the light-receiving surface in the step of providing the first charge.

19. The control method according to claim 13, wherein the travel characteristic represents a travel position of the light-shielding blade over time during the travel of the light-shielding device.

20. The control method according to claim 13, further comprising the control step of controlling a timing for performing the first scan based on the travel characteristic calculated in the calculation step.

21. A method of controlling an image-taking apparatus comprising an image-pickup device which accumulates charge in accordance with an amount of light received thereon, a light-shielding device which changes a light-shielded area in the image-pickup device by causing a light-shielding blade to travel, the light-shielding blade shielding a light-receiving surface of the image-pickup device, and a scan circuit which performs a first scan for starting accumulation of charge for each area of the image-pickup device and performs a second scan for reading the accumulated charge for each area of the image-pickup device, the method comprising the steps of:

providing first charge accumulated in a time period between one of the first and second scans by the scan circuit and the travel of the light-shielding blade by the light-shielding device;

providing second charge accumulated in a time period from the first scan to the second scan in a state in which the light-receiving surface of the image-pickup device is not shielded by the light-shielding device, by the scan circuit; and a control step of performing the first scan at a timing set in accordance with the amount of the first charge and the amount of the second charge by the scan circuit and then shielding light in the light-receiving surface of the image-pickup device by the light-shielding device.

22. A method of controlling an image-taking apparatus comprising an image-pickup device which accumulates charge in accordance with an amount of light received thereon, a light-shielding device which changes a light-shielded area in the image-pickup device by causing a light-shielding blade to travel, the light-shielding blade shielding a light-receiving surface of the image-pickup device, and a scan circuit which performs a first scan for starting accumulation of charge for each area of the image-pickup device and performs a second scan for reading the accumulated charge for each area of the image-pickup device, the method comprising the steps of:

providing first charge accumulated in a time period between one of the first and second scans by the scan circuit and the travel of the light-shielding blade by the light-shielding device;

providing second charge accumulated in a time period from the first scan to the second scan in a state in which the light-receiving surface of the image-pickup device is not shielded by the light-shielding device, by the scan circuit; and providing third charge accumulated in a time period from the first scan by the scan circuit to light shielding of the light-receiving surface of the image-pickup device by the light-shielding device, wherein a timing for performing the first scan by the scan circuit is controlled in accordance with the amount of the first charge and the amount of the second charge in the step of providing the third charge.

23. The control method according to claim 22, wherein the timing for performing the first scan by the scan circuit is controlled such that the shape of a curve representing a position of a scan area over time in performing the first scan approaches the shape of a curve representing a travel position of the light-shielding blade over time during the travel of the light-shielding device in the step of providing the third charge.

24. A method of controlling an image-taking apparatus comprising an image-pickup device which accumulates charge in accordance with an amount of light received thereon, a light-shielding device which changes a light-shielded area in the image-pickup device by causing a front blade or a rear blade to travel, the front blade and the rear blade shielding a light-receiving surface of the image-pickup device, and a scan circuit which performs a first scan for starting accumulation of charge for each area of the image-pickup device and performs a second scan for reading the accumulated charge for each area of the image-pickup device, the method comprising the steps of:

providing first charge accumulated in a time period from release of the light shielding of the light-receiving surface of the image-pickup device by the front blade of the light-shielding device to the second scan by the scan circuit;

providing second charge accumulated in a time period from the first scan to the second scan, in a state in which the light-receiving surface of the image-pickup device is not shielded by the light-shielding device, by the scan circuit;

providing third charge accumulated in a time period from the first scan by the scan circuit to light shielding of the light-receiving surface of the image-pickup device by the rear blade of the light-shielding device, wherein a timing for performing the first scan by the scan circuit is controlled in accordance with the amount of the first charge and the amount of the second charge in the step of providing the third charge.

* * * * *